A. E. MAYNARD.
FRAME STRETCHER.
APPLICATION FILED NOV. 26, 1919.
1,428,444.
Patented Sept. 5, 1922.
4 SHEETS—SHEET 1.
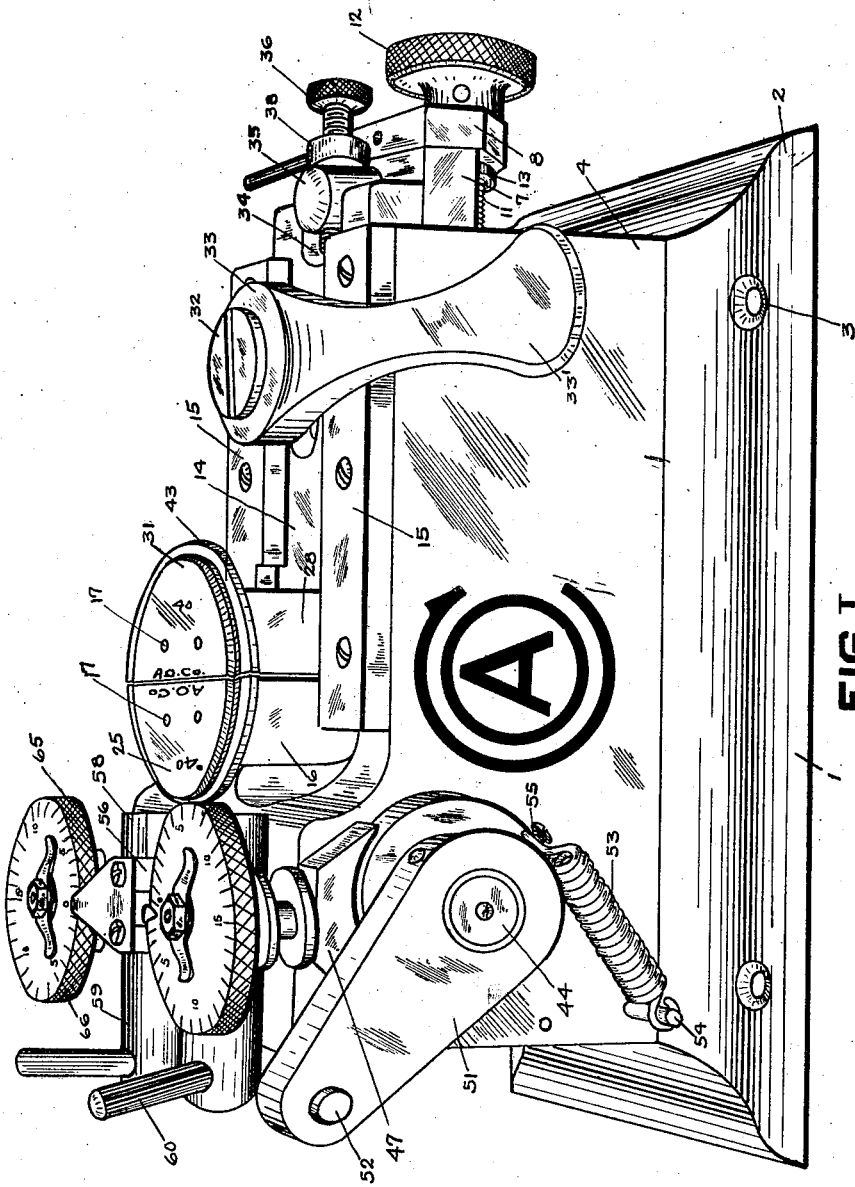
INVENTOR
A.E.MAYNARD
BY
H. H. Styll & H. K. Parsons
ATTORNEYS

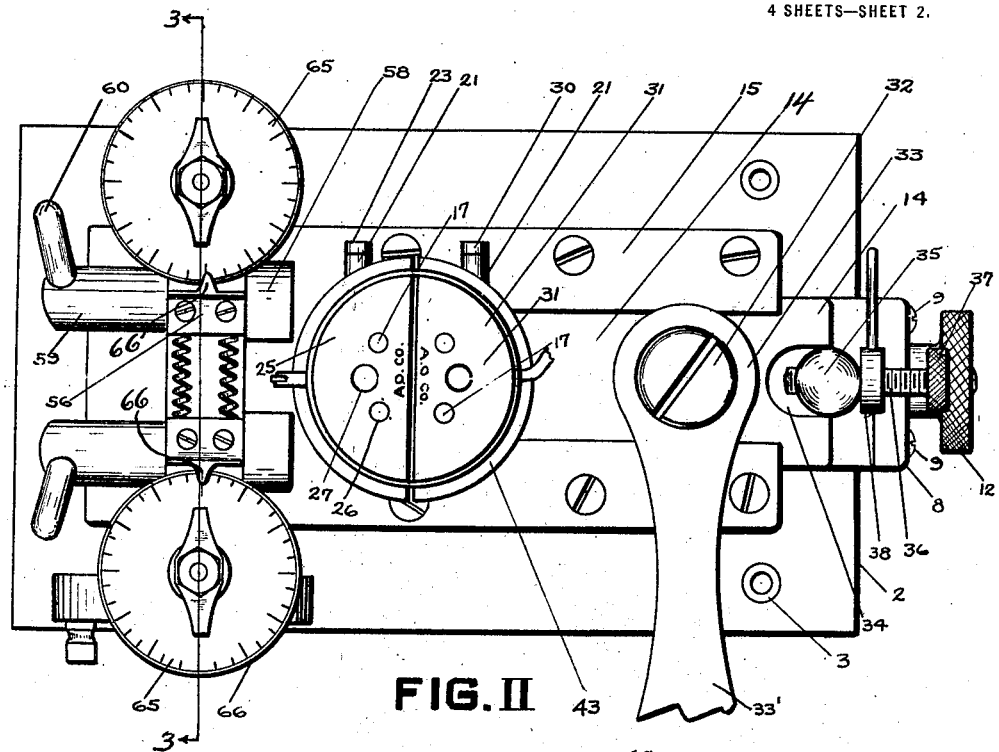
FIG. II
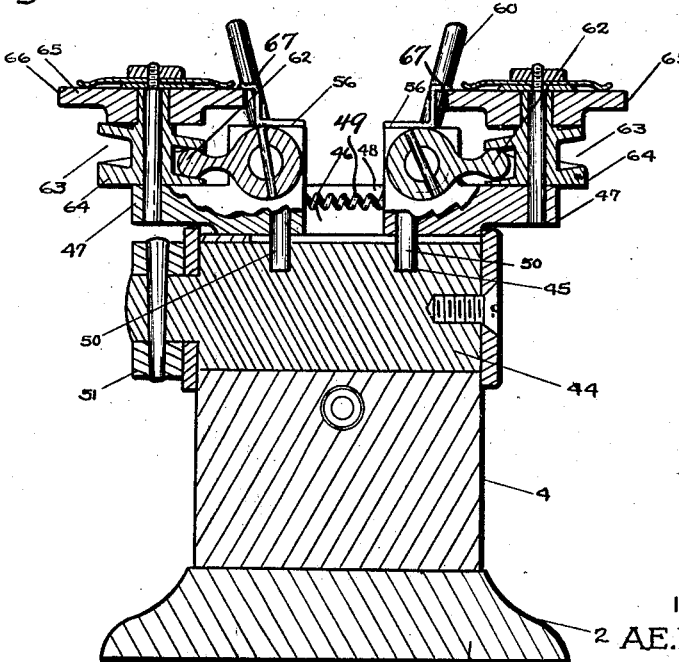
FIG. III
INVENTOR
A.E. MAYNARD
BY
ATTORNEYS

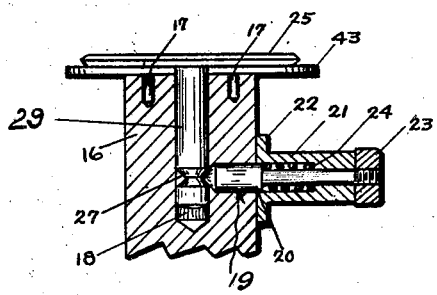
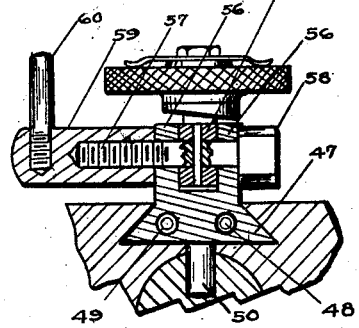
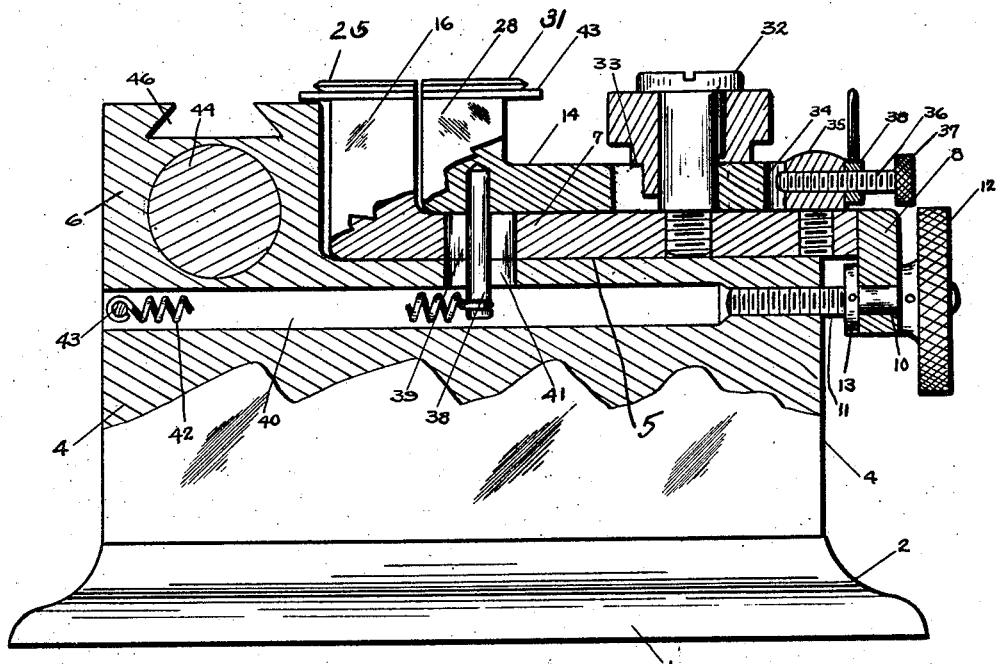

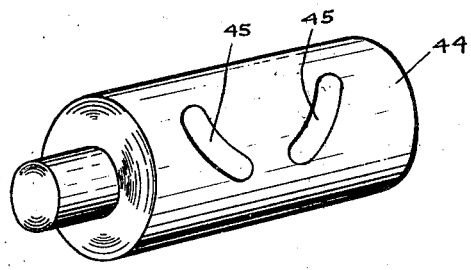
FIG. VII
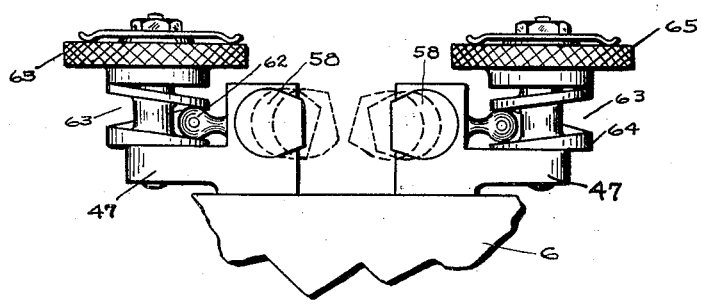
FIG. VIII

Patented Sept. 5, 1922.

1,428,444

UNITED STATES PATENT OFFICE.

ALBERT E. MAYNARD, OF SOUTHBRIDGE, MASSACHUSETTS, ASSIGNOR TO AMERICAN OPTICAL COMPANY, A VOLUNTARY ASSOCIATION OF MASSACHUSETTS.

FRAME STRETCHER.

Application filed November 26, 1919. Serial No. 340,722.

*To all whom it may concern:*

Be it known that I, ALBERT E. MAYNARD, a citizen of the United States, residing at Southbridge, in the county of Worcester and State of Massachusetts, have invented certain new and useful Improvements in Frame Stretchers, of which the following is a specification.

This invention relates to new and useful improvements in frame stretchers, and more particularly to what is known in the art to which the present invention appertains, as an eye wire stretcher for ophthalmic mountings.

The main object of the present invention is the provision of a machine of this character whereby the eye wire of the spectacle or eyeglass may be quickly and readily enlarged to accommodate a lens which has been ground to over size.

Another object of the present invention is the provision of a stretcher of the above character which can be quickly and readily adjusted so that different sized frames may be readily applied to the stretching block and said frames stretched to conform to the shape of the block and of the proper size to receive the lens adapted to be fitted therein.

A further object of the present invention is the provision of an eye wire stretcher provided with interchangeable stretching blocks which are not only of a different size but of different shapes, whereby various sizes and shapes of frames may be quickly and readily applied thereto and stretched to the desired size and shape to accommodate lenses to be placed therein.

Another object of the present invention is the provision of readily adjustable clamping members for engagement with the end piece portions of a frame to secure said end pieces together and retain the frame on the stretching device, which clamping members may be quickly and accurately adjusted according to the angle of inclination of the end pieces with respect to the eye wire.

With the above and other objects in view the invention consists in the novel features of construction, combination and arrangement of parts hereinafter more fully set forth, pointed out in the claims and shown in the accompanying drawings, in which:

Figure I is a perspective view of a stretching machine constructed in accordance with my invention.

Figure II is a top plan view.

Figure III is a transverse sectional view taken on the line III—III of Fig. II.

Figure IV represents a fragmentary sectional view illustrating the means for retaining the eye plate sections.

Figure V represents a detail sectional view of the end piece clamp controlling mechanism.

Figure VI represents a longitudinal sectional view of the operating parts of the machine.

Figure VII represents a perspective view of the end piece clamp control roller.

Figure VIII represents a fragmentary end view of the machine, certain positions occupiable by the end piece clamps being indicated in dotted lines.

In carrying out my invention I provide a base number 1, having an outwardly projecting flange 2 provided with suitable openings 3 adjacent the outer edge thereof, whereby to receive set screw bolts or the like for suitably securing the base 1 to a support. Mounted upon the base member is a guide member 4 which consists of a substantially solid block member having in its upper face the longitudinal guide way 5, and further provided with an upstanding portion 6 at one end thereof. Mounted for sliding movement within the guide way 5 of the body member 4 is the adjustable plate or main slide 7, provided at its outer end with a detachable plate 8 suitably secured to the end of the plate 7 by means of the screws 9. The lower edge of this plate 8 extends below the lower surface of the plate 7 and receives through the opening 10 the adjustable screw bolt 11, as shown in the accompanying drawings. This screw bolt is provided with a knurled thumb nut 12 arranged upon one side of the plate 8 and further provided with a collar 13 arranged upon the opposite side of the plate, and as this screw bolt 11 is adjustably mounted within a threaded opening in the body member 4, turning movement of the thumb nut 12 will impart movement to the screw bolt and in addition provide a sliding movement for the plate 7 within the guide way 5.

Movably mounted upon the upper face of the plate 7 is a second plate or supplemental slide 14 suitably retained in place by means of the guide plates 15 which are removably secured to the upper face of the body member 4 and project inwardly over the guide way 5 and contact with the upper face of the plate 14 in order to retain the same in position within the guide way and upon the plate 7.

Formed integral with or otherwise secured to the inner end of the plate 7 is an upstanding support 16, the upper end of which is provided with spaced pin members or studs 17 and further provided with a vertically disposed opening 18, connecting at its lower end with a transverse opening 19, in which is slidably mounted a retaining pin 20. This pin 20 is mounted for sliding movement within a sleeve 21 secured to the side of the block by means of the plate 22. The pin 20 is provided at its outer end with a suitable head member 23 and arranged around the pin within the sleeve 21 is a coil spring 24, one end of which is secured to the pin itself, while the other end is secured to the sleeve 21, so as to normally retain the inner end of the pin 20 within the opening 18. Removably mounted upon the upper end of the support 16 is half of the eye wire block or eye plate section, as indicated at 25, provided with spaced openings 26 to receive the studs 17 on the support 16, and further provided with a downwardly projecting finger 29 having a suitable notch 27, whereby the end of the pin 20 will engage within the notch when the finger is inserted in the opening 18 so as to securely retain the member 25 in its proper position upon the upper end of the support 16.

Projecting upwardly from the inner end of the plate 14 is a support 28 similar to the support 16 upon the plate 7. This support 28 is constructed similar to the support 16 and is provided with the vertical opening 18, the transverse opening 19, and the spring actuated pin 20 which retains the second half of the eye wire block or eye plate section 31 in position upon the support 28. The block 14, as illustrated is mounted for sliding movement between the guide plates 15 and the plate 7, and in order to provide for such movement a bolt 32 is extended down through an opening in the plate 14 and threaded into the plate 7. This bolt 32 is provided with a suitable cam 33 arranged within the opening in the plate 14, whereby upon turning movement of the bolt 32 it will reciprocate the plate 14 between the guide plates 15 and plate 7, thus moving the support 28 toward and away from the support 16 to bring together and separate the eye wire blocks 25 and 31. In order to provide actuating means for the bolt 32 a handle member 33' is secured to this bolt adjacent the upper end thereof, whereby the bolt may be readily turned by grasping the handle and moving it back and forth.

In order to provide suitable limiting means for the relative movement between the two sections of the eye wire block, the plate 14 is provided with an arcuate recess 34 at its outer end, and arranged within this recess is a stud 35 carried by the plate 7 and provided with a screw threaded opening extending transversely therethrough, in which is mounted a screw 36, the outer end of which is provided with a head 37 whereby adjustment of the screw 36 within the stud 35 will tend to limit movement of the plate 14. This screw bolt 36 is locked in position by means of a suitable lock nut 38 mounted upon the screw and disposed between the head thereof and the stud 35.

From this it will be noted that when it is desired to stretch an eye wire frame the same is placed in position over the two sections 25 and 31 of the stretching block, the handle member 33 is then grasped and moved toward or away from the operator to impart a sliding movement to the plate 14, which in turn will separate the two sections of the block 25 and 31 and stretch the eye wire to the desired size, the size having been previously regulated through the adjustment of the screw 36. In order to provide for an automatic return to their normal positions of the stretching blocks, I provide a pin 38 connected with the block 14 and extending downwardly through a longitudinal slot 39 in the block 7 and projecting into a longitudinal opening 40 within the body member 4. The body is also provided with a longitudinal slot 41 which communicates with the opening 40 to permit sliding movement of the pin 38. Connected to the lower end of this pin 38 is one end of a coil spring 42, the outer end of which is connected to a transverse pin 43 extending through the end of the body member 4, and from this it will be noted that as the plate 14 is moved outwardly within the guide way 5 over the plate 7 the coil spring 42 will be placed under tension so that when the hand lever 33 is released the tension of the spring 42 will automatically return the plate 14 within the guide way and thus in turn the blocks 25 and 31 will be returned to their normal position.

It is preferable to provide upon the upper ends of the supports 16 and 28 a suitable plate 43, whereby an eye wire of a spectacle or eyeglass may be quickly and readily dropped upon the plate and positioned upon the edges of the sections 25 and 31 of the stretching block.

Having thus described the construction and operation of the stretching mechanism, I will now proceed to describe the manner in which the frames are securely held in position during the stretching operation.

As illustrated in the drawings, the upstanding portion 6 at one end of the body 4 is provided with a transverse bearing opening, in which is mounted the shaft 44, the central portion of which forms substantially a barrel cam and is provided with the spiral grooves 45 curving inwardly toward each other. This upstanding portion 6 is also provided with a dove-tail groove 46 extending throughout the entire width thereof, and in which are mounted the sliding bearing members 47, the inner ends of which are provided with spaced openings 48, and as these two bearing members face each other within the groove suitable coil springs 49 are disposed between the two inner ends of the bearing members, the ends of said coil springs being disposed within the openings 48 whereby to normally retain the bearing members in spaced position. These bearing members 47 are provided upon their lower faces with suitable pins 50 which are adapted to be disposed within the curved grooves 45 of the shaft 44, whereby upon turning movement of the shaft 44 in one direction the bearing members 47 will be forced inwardly within the grooves 46 toward each other and upon releasing the shaft 44 the coil springs 49 will tend to force the said bearing members apart. In order to provide suitable means for rotating the shaft 44 I secure to one end thereof a crank arm 51, the outer end of which is provided with a stud 52 whereby any suitable means such as a link and foot treadle, or the like may be connected therewith to operate the crank arm for rotating the shaft 44, and in order to normally retain the shaft 44 in such a position that the pins 50 will be normally disposed in the ends of the grooves 45 which are the farthest distance apart, I provide a coil spring 53, one end of which is secured to a pin 54 carried by the body 4 while the other end is connected, as shown at 55, to the inner end of the crank arm 51.

The bearing members 47 which are mounted for sliding movement within the grooves 46, are provided upon their upper faces with the vertically disposed spaced arms 56 having alined transverse openings formed therein to receive for rotating movement a shaft member 57, the inner end of which is provided with a gripping block 58, while mounted upon the outer end, which is screw threaded, is a sleeve 59 adapted to be rotated upon the shaft 57 by means of the angular arm 60. Thus by rotating the sleeve 59 so as to loosen the same upon the shaft 57, the shaft may be readily rotated within the bearings in the arms 56. As illustrated in the accompanying drawings, both of the bearing members 47 are constructed substantially the same and it is thought that a suitable description of one of these bearing members will be sufficient to set forth the construction and operation.

The shaft 57 is provided with a collar 61 disposed between the arms 56 and provided with an outwardly projecting pin 62 having a rounded end or ball member upon the outer end which is adapted to ride in the spiral groove 63 formed on the rotatable member 64. This member 64 is mounted at its lower end in a suitable bearing; the upper end thereof is provided with a suitable plate 65, the outer edge of which is knurled, as shown at 66, whereby it may be readily grasped to rotate the member 64, and as the end of the pin 62 rides within the spiral groove 63 it will tend to rotate the shaft 57 and dispose the face of the block 58 in various angularly adjusted positions. The upper face of this plate 65 is provided with a suitable scale and an indicator 67 is carried by the upper ends of the arms 56 and adapted to be used in connection with the scale upon the upper face of the plate 65, whereby turning movement of both of the plates 65 will accurately adjust the two gripping blocks 58 to the desired angle so that when the shaft 44 is rotated to actuate the bearing members 57 and bring these blocks 58 into contact with the end pieces of a spectacle or eyeglass the two faces of the blocks will contact squarely with the end pieces according to the angles thereof.

It will be noted that downward movement of the crank arm 51 will tend to force the bearing members 47 toward each other to bring the blocks 58 into contact with the end pieces, but as soon as the crank arm is released the coil spring 53 will return the bearing blocks to their normal positions, as illustrated in Figure I.

From the foregoing description taken in connection with the accompanying drawings, it will be readily apparent that I have provided a simple and durable machine whereby the eye wires of spectacles and eyeglasses can be quickly and readily stretched or adjusted to various sizes and shapes, and it will be noted that while the plates 25 and 31 illustrated in the accompanying drawings, are of the round eye wire type, that these plates may be readily interchanged for other plates of various shapes and sizes. In stretching an eye wire the same is first dropped upon the plate 43 and positioned over the edges of the stretching block and the temple end pieces disposed between the inner faces of the blocks 58. The crank arm 51 is then actuated to rotate the shaft 44 and bring the bearing members 47 toward each other, whereby the blocks 58 will be disposed in gripping engagement with the temple end pieces. The handle member 33' is then actuated to rotate the bolt 32 to thus reciprocate the plate 14 within the guide way 5 to actuate in turn the support 28, which will tend to draw the section 31 of the stretching block away from the section 25 to thus provide a stretching movement of the eye wire. As soon as the eye wire has been stretched to the desired size the handle member 33 is released, the coil spring returning the section 31 to its normal position and the crank arm is then released whereby the bearing members 47 will be returned to their normal position through the tension of the coil springs 49, and the machine is again in readiness for a similar operation.

I claim:

1. A device of the character described comprising a pair of relatively movable slide members, eye wire plates carried by said members, and means for relatively shifting said plates.

2. A machine of the character described including means for clamping a frame in position, a sectional eye plate adapted to be positioned within the frame, and means for separating the sections of the plate.

3. A machine of the character described including means for clamping a frame in position, a sectional eye plate adapted to be positioned within the frame, means for separating the sections of the plate, and adjustable means for limiting said separation.

4. An eye wire stretching machine comprising a pair of relatively movable slides, sectional eye plate members removably mounted on the slides, means for clamping a frame in position around the plates, and means for relatively shifting the slides and plates to stretch the frame.

5. An eye wire stretching machine comprising a pair of relatively movable slides, sectional eye plate members removably mounted on the slides, means for clamping a frame in position around the plates, means for relatively shifting the slides and plates to stretch the frame, and adjustable means for limiting said movement.

6. A machine of the character described, including a sectional frame stretching plate, clamps for securing a frame about said sectional plate, means for adjusting the plate as an entirety toward and away from the clamps, and means for relatively adjusting the sections of the plate to tense the frame therearound.

7. In a device of the character described, the combination with a base, of a pair of shiftable members mounted on the base, said members each having sockets formed therein adapted to receive eye plate sections and eye wire clamp members mounted on the base adjacent said parts, said clamp members including angularly adjustable jaws, means for adjusting the jaws, means for locking the jaws in adjusted position, and a barrel cam having means engaging both of the jaws for shifting them into and out of operative position.

8. An eye wire stretching machine including a sectional eye wire receiving plate, means for clamping an eye wire around said plate, means for bodily adjusting the plate with respect to the eye wire, clamping means and additional means for relatively shifting portions of the plate to stretch the eye wire when in clamped position.

9. An eye stretching machine including a base and longitudinal and transverse slide ways formed on the base, clamping means adjustably mounted in the transverse slide way, and stretching means operable on the longitudinal slide way.

10. An eye stretching machine including a base and longitudinal and transverse slide ways formed on the base, clamping means adjustably mounted in the transverse slide way, stretching means operable on the longitudinal slide way, and cam members for actuating said clamping and stretching means.

11. In a device of the character described, clamping means including a pair of slides and a single cam for simultaneously shifting the slides toward or away from each other, clamp jaws carried by the slides, said clamp jaws being pivotally secured to the slides, and spiral cams for adjusting the clamp jaws.

12. In a device of the character described, clamping means including a pair of slides and a single cam for simultaneously shifting the slides toward or away from each other, clamp jaws carried by the slides, said clamp jaws being pivotally secured to the slides, and spiral cams for adjusting the clamp jaws, and means for indicating the adjustment of the clamp jaws.

13. A clamp jaw for a device of the character described, comprising a slide, a jaw member pivoted to the slide, a spiral cam for pivotally adjusting the jaw member, means associated with said parts for indicating the adjustment of the jaw member, and means for positively locking the jaw member in desired angularly adjusted position.

14. Frame clamping means for an eye wire stretcher, comprising a pair of slides, angularly adjustable jaws carried by the slides, means for resiliently pressing said jaws into inoperative position, and cam means for forcing the jaws into operative position.

15. An eye wire stretcher comprising a base, a pair of clamp jaws slidably mounted on the base, means for controlling the position of the clamp jaws, a main slide, means for adjusting the main slide in the direction of the clamp jaws, a supplemental slide mounted on the main slide of the plate, sections carried by the two slides, and cam means for forcing the eye plate sections apart.

16. An eye wire stretcher comprising a base, a pair of clamp jaws slidably mounted on the base, means for controlling the position of the clamp jaws, a main slide, means for adjusting the main slide in the direction of the clamp jaws, a supplemental slide mounted on the main slide of the plate, eye plate sections carried by the two slides, cam means for forcing the eye plate sections apart, and means for adjustably limiting the separation of the eye plate sections.

17. An eye wire stretcher comprising a base, a pair of clamp jaws slidably mounted on the base, means for controlling the position of the clamp jaws, a main slide, means for adjusting the main slide in the direction of the clamp jaws, a supplemental slide mounted on the main slide of the plate, eye plate sections carried by the two slides, cam means for forcing the eye plate sections apart, and means for adjustably limiting the separation of the eye plate sections, said eye plate sections being detachably secured to the slides.

18. In a device of the character described, the combination with a base, of a main slide mounted on the base, a supplemental slide carried by the main slide and a single spring means for pressing both of the slides inwardly on the base.

19. In a device of the character described, the combination with a base, a main slide mounted on the base, a supplemental slide carried by the main slide, a single spring means for pressing both of the slides inwardly on the base, and means for simultaneously shifting both slides outwardly in opposition to the action of the spring.

20. In a device of the character described, the combination with a base, of a main slide mounted on the base, a supplemental slide carried by the main slide, a single spring means for pressing both of the slides inwardly on the base, means for simultaneously shifting both slides outwardly in opposition to the action of the spring, and supplemental means for shifting the second slide outwardly with respect to the first.

21. In a device of the character described, the combination with a base, of a main slide mounted on the base, a supplemental slide carried by the main slide, a single spring means for pressing both of the slides inwardly on the base, means for simultaneously shifting both slides outwardly in opposition to the action of the spring, supplemental means for shifting the second slide outwardly with respect to the first, and an adjustable stop for variably limiting the relative movement of the two slide members.

22. In a device of the character described, the combination with a slide member, of an eye plate having a stud fitting therein, a resilient detent for securing the stud in position, and a supplemental positioning pin carried by one of the parts and engaged in the other for securing them in desired relation.

23. In a device of the character described, the combination with a slide member, of a clamp jaw pivotally supported by the slide member, means for adjusting the position of the clamp jaw including a spiral cam mounted on the slide and engaging the jaw, a head for rotating the cam to tilt the jaw, said head being provided with a dial portion indicating the angle to which the jaw has been adjusted, and the slide having an indicator secured thereon and disposed adjacent the dial for cooperation therewith.

24. In a device of the character described, the combination with a pair of clamp jaw slides having angularly adjustable clamp jaws and depending controlling pins, of a barrel cam member, engaging the pins, and means for positively rocking the barrel cam in one direction to bring the jaws into operative engagement.

25. In a device of the character described, the combination with a pair of clamp jaw slides having angularly adjustable clamp jaws and depending controlling pins, of a barrel cam member engaging the pins, means for positively rocking the barrel cam in one direction to bring the jaws into operative engagement, and resilient means for shifting the barrel cam in the opposite direction to release the jaws.

26. In a device of the character described, the combination with a slide member, of a clamp jaw pivotally supported by the slide member, means for adjusting the position of the clamp jaw including a spiral cam mounted on the slide and engaging the jaw, a head for rotating the cam to tilt the jaw, said head being provided with a dial portion indicating the angle to which the jaw has been adjusted, and means for locking the jaws in desired angularly adjusted position.

In testimony whereof I have affixed my signature, in presence of two witnesses.

ALBERT E. MAYNARD.

Witnesses:
ALICE G. HASKELL,
ESTHER M. SAFLER.